United States Patent
Diaz et al.

(10) Patent No.: US 11,078,442 B2
(45) Date of Patent: Aug. 3, 2021

(54) METHOD AND TEST KIT FOR RECREATION OF AN ODOR

(71) Applicant: Symrise AG, Holzminden (DE)

(72) Inventors: Edison Diaz, Goslar (DE); Daniel Kohrs, Holzminden (DE); Katharina Michels, Seesen (DE); Sebastian Buch, Brakel-Riesel (DE)

(73) Assignee: Symrise AG, Holzminden (DE)

( * ) Notice: Subject to any disclaimer, the term of this patent is extended or adjusted under 35 U.S.C. 154(b) by 0 days.

(21) Appl. No.: 16/477,310

(22) PCT Filed: Feb. 3, 2017

(86) PCT No.: PCT/EP2017/052397
§ 371 (c)(1),
(2) Date: Jul. 11, 2019

(87) PCT Pub. No.: WO2018/141402
PCT Pub. Date: Aug. 9, 2018

(65) Prior Publication Data
US 2020/0157464 A1    May 21, 2020

(51) Int. Cl.
*C11B 9/02* (2006.01)
*B01J 3/04* (2006.01)
(Continued)

(52) U.S. Cl.
CPC .......... *C11B 9/025* (2013.01); *B01D 11/0219* (2013.01); *B01D 11/0288* (2013.01);
(Continued)

(58) Field of Classification Search
CPC ..... B01D 11/00; B01D 11/02; B01D 11/0215; B01D 11/0253; B01D 11/0288;
(Continued)

(56) References Cited

U.S. PATENT DOCUMENTS

| 1,802,533 A | 4/1931 | Reid |
| 3,638,820 A * | 2/1972 | Misu ............... A47J 41/022 |
| | | 215/12.2 |

(Continued)

FOREIGN PATENT DOCUMENTS

| CN | 106474764 | * | 3/2017 |
| CN | 108310798 | * | 7/2018 |
| WO | 2007017206 A1 | | 2/2007 |

OTHER PUBLICATIONS

Alchimia, "Killer Bee BHO extractor," available at <https://www.alchimiaweb.com/en/killer-bee-bho-extractor-product-5139.php>, dated Jul. 17, 2014 via <https://archive.org>. (Year: 2014).*

(Continued)

*Primary Examiner* — Katherine Zalasky McDonald

(74) *Attorney, Agent, or Firm* — Dilworth & Barrese, LLP

(57) ABSTRACT

Suggested is a method for the extraction of fragrances from natural starting material consisting of the following steps: (a) providing a sample of the natural starting material in a pressure proof sample container; (b) bringing in the sample in contact with liquefied petroleum gas of propane and/or butane gas, preferably; (c) extracting the fragrances from the natural starting material provided in step (b); (d) venting of the pressure proof sample container, while the liquefied petroleum gas is evaporated and the fragrances is maintained as residue in the container; and optionally (e) dissolving the fragrances in a suitable solvent.

17 Claims, 10 Drawing Sheets

(51) Int. Cl.
 *B01D 11/02* (2006.01)
 *B01L 3/12* (2006.01)
(52) U.S. Cl.
 CPC ............... *B01J 3/048* (2013.01); *B01L 3/12* (2013.01); *B01L 2300/049* (2013.01); *B01L 2300/0851* (2013.01); *B01L 2300/0854* (2013.01); *B01L 2300/12* (2013.01)
(58) Field of Classification Search
 CPC ...... B01L 3/00; B01L 3/04; B01L 3/12; B01L 3/14; B01L 3/508; B01L 2300/12; B01L 2300/04; B01L 23/041; B01L 2300/0832; B01L 2300/0835; B01L 2300/0854; B01L 2300/14
 See application file for complete search history.

(56) References Cited

U.S. PATENT DOCUMENTS

| | | | | |
|---|---|---|---|---|
| 4,830,217 | A * | 5/1989 | Dufresne | B01L 3/5082 422/550 |
| 7,419,832 | B2 * | 9/2008 | Hunsley | B01L 3/5082 220/23.91 |
| 9,296,979 | B1 | 3/2016 | Kuo et al. | |
| 10,265,295 | B2 * | 4/2019 | Sorbo | A61K 31/352 |
| 10,745,648 | B1 * | 8/2020 | Lewis | B30B 15/04 |
| 2003/0198577 | A1 * | 10/2003 | Schneider | B01L 3/5082 422/400 |
| 2008/0128261 | A1 * | 6/2008 | Balass | B01D 5/006 202/176 |
| 2009/0234146 | A1 * | 9/2009 | Cooney | C12M 47/06 554/174 |
| 2011/0133120 | A1 | 6/2011 | McGhee | |
| 2013/0251824 | A1 * | 9/2013 | Hospodor | B01D 11/0292 424/725 |
| 2014/0323787 | A1 | 10/2014 | Carl | |
| 2015/0233655 | A1 * | 8/2015 | Ghiasvand | F25D 3/10 165/61 |
| 2016/0059149 | A1 * | 3/2016 | Hopkins | B01D 11/0219 422/112 |
| 2016/0122685 | A1 * | 5/2016 | Martinsen | B01D 11/0215 554/8 |
| 2016/0228787 | A1 * | 8/2016 | Payack | B01D 3/343 |
| 2017/0312651 | A1 * | 11/2017 | Galyuk | B01D 11/028 |
| 2019/0382327 | A1 * | 12/2019 | McGrane | C11B 3/10 |
| 2020/0288786 | A1 * | 9/2020 | Niebling | A61M 11/042 |

OTHER PUBLICATIONS

Colibri, "Butane 300ml," available at <http://www.colibri.com/butane-300ml-two-pack.html>, dated Aug. 30, 2014 via <https://archive.org>. (Year: 2014).*

Buzznn.ca, "Killer Bee Deal," available at <https://www.buzznn.ca/product_info.php?cPath=8&products_id=37>, on sale Jan. 22, 2015. (Year: 2015).*

Machine Translation of CN 108310798, originally published Jul. 24, 2018. (Year: 2018).*

Machine translation of CN 106474764, originally published Mar. 8, 2017. (Year: 2017).*

* cited by examiner

METHOD AND TEST KIT FOR RECREATION OF AN ODOR

FIELD OF INVENTION

The present invention relates to a method and a test kit for the extraction of fragrances from natural starting materials. The provided extract captures the scent of a plant or a fruit in such a way that is a true rendition of the original product's scent or flavor and thus is suitable for the recreation of odors.

STATE OF THE ART

In the field of perfume and flavor making, there is a constant need for new or modified fragrances and aromas, respectively, which have to meet the most diverse demands. The search for appropriate fragrances and aromas is made difficult particularly due to the fact that the relations between the perception of fragrance and aroma, respectively, and the chemical structure of the scent and flavoring substance are not sufficiently known. Furthermore, it is found that minor changes in the structural composition of known scents and flavoring substances can often produce strong changes of the respective olfactory and flavor characteristics. The relations in the commonly used fragrance and aroma compositions, which consist of a mixture of multiple scents and flavoring substances, are even more complex.

In spite of a large number of already existing fragrances and flavoring substances, the necessary adaptation to changing fashion trends and the constantly rising demand for new fragrances which alone or in the form of compositions are valuable perfume substances or perfumes with interesting perfume notes, there is still an ongoing constant and general demand in the perfume industry for novel fragrances and flavors with which novel effects can be achieved in perfumes and with which novel fashion trends can thus be created.

Extractions using supercritical carbon dioxide as the extraction solvent are well known in the art. Extractions with supercritical carbon dioxide for creation of essential oils, fragrances and other herbal distillates have also already been known. Mainly carbon dioxide is used as extraction solvent because it is non-toxic and non-flammable in contrast to some of the typical used solvents, such as hexane and acetone. Other advantages of extractions with supercritical $CO_2$ are that e.g. most of the volatile components, which tend to be lost in hydrodistillation, are present in the supercritical extracts; further carbon dioxide can be easily separated after the extraction from extracted starting material by evaporation or by recycled by condensation into a cold recovery vessel etc. for example EP 0711508 B1 (SKW TROSTBERG) teaches an industrial process for producing fragrances from natural sources requiring a preliminary extraction using for example butane or propane as solvents followed by the main extraction using supercritical carbon dioxide.

However, the extraction with supercritical carbon dioxide is usually a procedural cyclic process to recycle the $CO_2$. In particular pressure is very high and therefore needs very pressure resistant equipment. Furthermore it is a big instrument, doesn't fit into a small mobile kit.

Therefore, it has been the object of the present invention to provide a simple method for the recreation of an odor. Particularly, it was an object of the present invention to develop an extraction method which does not show the disadvantages of a procedural cyclic extraction process with fluids in supercritical conditions, but having the advantages of gas extraction such as mild conditions, fast extraction etc.

Furthermore, it was an important object to provide a simple solution which is easy to handle and which can be taken anywhere and can be used on a wide range of materials which is to be extracted, and at the same time yields extraction samples which capture the scent of a plant or a fruit in such a way that is a true rendition of the original product's scent or flavor.

DESCRIPTION OF THE INVENTION

The object of the present invention is directed to a method for the extraction of fragrances from natural starting material consisting of the following steps:
(a) providing a sample of the natural starting material in a pressure proof sample container;
(b) bringing in the sample in contact with liquefied petroleum gas of propane and/or butane gas, preferably;
(c) extracting the fragrances from the natural starting material provided in step (b);
(d) venting of the pressure proof sample container, while the liquefied petroleum gas is evaporated and the fragrances is maintained as residue in the container; and optionally
(e) dissolving the fragrances in a suitable solvent.

Despite the teaching of the prior art it has been surprisingly found that for the purpose of recreation of an odor it is by far sufficient to conduct extraction of natural materials by a one-step extraction using simple extraction solvents like for example n-butane. The use of supercritical carbon dioxide, which seems to be necessary for producing fragrances from natural resources on an industrial level, has been found to be superfluous. Therefore, the process according to the present invention matches fully with the condition for providing a simple alternative to obtain small samples of fragrances from various sources in short time, with a minimum of technical equipment and a maximum of reliability in terms of completeness of the odor impression.

BRIEF DESCRIPTION OF THE DRAWINGS

The present invention will be described in greater detail with reference to the accompanying figures in which FIG. 1 schematically illustrates opening the sample container by unscrewing the screwcap and inserting the filled sachet, FIG. 2 schematically illustrates closing the sample container by re-screwing the screwcap such that one end of the sachet is close to the bottom of the sample container and the other end of the sachet is near the screwcap, FIG. 3 schematically illustrates bringing a pressurized gas container towards the sample container, FIG. 4 schematically illustrates connecting the pressurized gas container to the sample container through the screwcap, FIG. 5 schematically illustrates the pressurized gas container connected to the top of the sample container, FIG. 6 schematically illustrates pressing the pressurized gas container to expel gas into the sample container, FIG. 7 schematically illustrates gas filled into the sample container up to a certain level, FIG. 8 schematically illustrates adding ethanol to the sample container before gas is completely evaporated, FIG. 9 schematically illustrates removing extract solution from the sample container with a pipette, and FIG. 10 schematically illustrates transferring the extract solution from the pipette into another container.

Extraction Method

Figure 1:
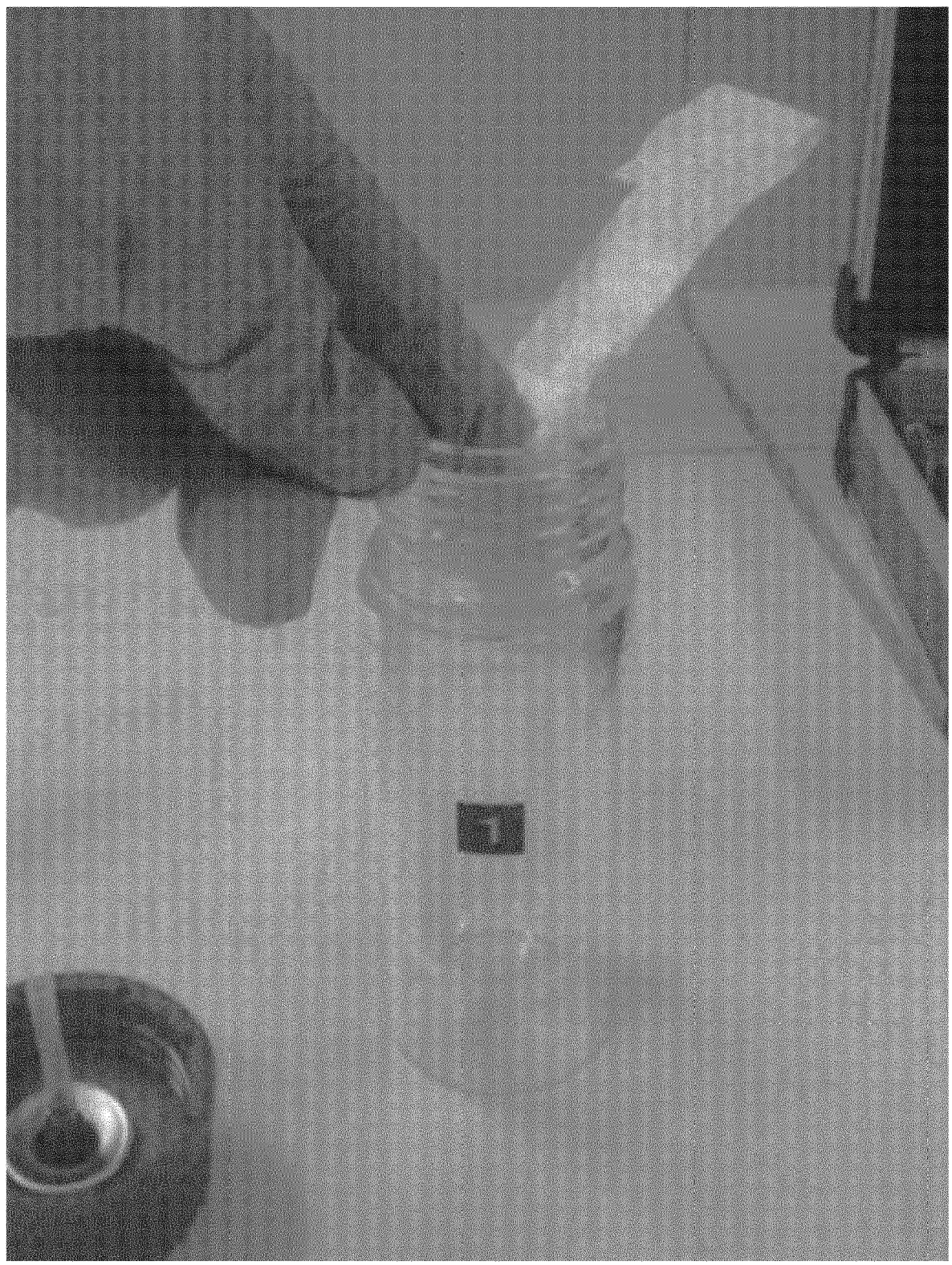

Liquefied petroleum gas in the sense of the present invention is used here as extracting solvent and refers to propane and/or butane that are liquefied preferably at room temperature (20° C. to 25° C.) at a pressure of about 1.5 bar. Most preferred is n-butane.

In a preferred embodiment of the method according to the present invention, the natural starting material consisting of the whole plants, leaves, blossoms, stems, seeds, bark, wood, resins, petals, stamen, pollen, fruits, root or a shoot of the plant, parts of fruits or blossoms. The plant material may be treated after harvesting and before the extraction. The plant material may be grinded, milled, pounded, chopped or be treated in any way to make the material fit for extraction or can be taken as it is.

In a further preferred embodiment of the method according to the present invention, the natural sample material is put into a sachet before the extraction. Preferably the sachet for the natural starting material consists of permeable materials that permits the penetration of the extracting solvent, thus the natural starting material sample could sufficiently be wetted with the extracting solvent. The permeable material is inert to the extracting solvent and is preferably made of cellulose (because it's similarity to natural material and it's good characteristics regarding flavor and scent) or cotton, glass fiber or any inert polymer material, which allows the extracting solvent to permeate.

The separation of the liquefied petroleum gas from the extract is preferably simply through the expansion of the pressure from the pressure proof sample container, thus butane and/or propane could vaporized from the container in the air and the fragrance compounds could maintained as residue in the container (extract). Advantageously, removing n-butane and propane is easily done by evaporation also in safety aspects, e.g. the inflammation point is for propane about 470° C. and for n-butane about 365° C., thus there is no inflammation danger.

In a preferred embodiment of the method according to the present invention, the solvent for absorbing the fragrances is a short chain alcohol with 1 to 5 carbon atoms, preferably methanol or ethanol. Most preferred is ethanol. Advantageously, the fragrances obtained by the extraction method of the present invention are absorbed best in said solvent(s) without loss of (odor) quality through reaction with the solvent or decomposition. (please see the comment below)

In a preferred embodiment of the method according to the present invention, the obtained extract comprises or consists of a mixture of fragrances (and solvent), which mirror the sensorial profile of preferably the plant starting material, particularly which capture the scent of the extracted plant or a fruit in such a way that is a true rendition of the original product's scent or flavor.

In a preferred embodiment of the method according to the present invention, the method is a micro-extraction method for odor test.

The term micro-extraction refers to an extraction process which is not a large-scale and not a procedural cyclic process. In particular the term micro-extraction should mirror the fact, that the extraction method can be taken anywhere, for that the quantity of the material to be extracted is not great and the obtained extract is only little, thus it is a small scale procedure, which preferably could be done anywhere.

In a preferred embodiment of the method according to the present invention, the sample of the natural starting material, which is preferably a plant material as described above, has a maximum weight of 50 g, preferably from about 1 to 30 g, more preferred from about 1-20 g, most preferred from about 1 to 10 g.

As explained above, it has been observed that the method of (micro-) extraction of the present invention is simple to handle and must not be integrated into a large-scale process or a cyclic extraction process, and thus could be procedural performed anywhere while the extracts obtaining through the method of the present invention show a high quality sensory profile and odor. In particular it has been observed that the extracts obtained capture the scent of the plant or the fruit which has been extracted in such a way that is a true rendition of the original product's scent or flavor. This allows reproduction of the native smell in high quality to perfumers.

Particularly, the extraction method of the present invention gives high quality extracts in odor sensory aspects without the need of any further performing steps. There are no purification steps or any further additional extraction steps with any further solvents needed. It is a kind of one-step, mobile, portable extraction method (micro-extraction).

Kit

Thus, a further aspect of the present invention is a kit for an extraction, preferably a micro-extraction as described above, of fragrances from natural starting material, which is preferably plant starting material as mentioned above, comprising or consisting of:

(i) a pressure proof sample container with septum (please see comments below);
(ii) a pressure vessel (or container), containing liquefied petroleum gas of propane and/or butane gas, equipped with an outlet device, which is suitable to release the liquefied petroleum gas of propane and/or butane gas, into the pressure proof sample container, preferably in that the liquefied gas is pumped from the pressure proof sample container through the septum, which possesses a valve, into the pressure container;
(iii) a coupler for the connection of (i) and (ii)
(iv) a sachet, suitable for the intake of sample materials, especially natural starting materials as defined above; and optionally
(v) a storage container suitable for absorbing the extracted compounds, which are preferably fragrances that are solubilized in a solvent, which is inert, preferably methanol or ethanol.

In an embodiment of the kit of the present invention, the pressure proof sample container is a double-walled container, wherein the outer wall of the double-wall preferably comprises or consists of synthetic thermoplastic materials. Preferably, the inner wall of the double-wall comprises or consists of an inert material, preferably glass. Most preferred are pressure vessels with an outer wall consisting of plastics (the outer vessel is made of plastic, preferably polypropylene to avoid damage of the inner vessel and to prevent potential splitter in case of bursting of the inner vessel) the ground of the inner vessel is preferably rounded for an easy removal of fragrance extract PET and an inner wall consisting of glasses and thus do not react with the compounds of the obtained extract. Further, the inner wall of the double-wall of the storage container preferably consists of tinted glasses. This advantageously influences the compounds of the extraction in that way that they are protected from any decomposition caused by light. (inner vessel is preferably made of glass mostly preferred borosilicate glass, because of fast and easy cleaning, especially it is ready for a new extraction simply by rinsing out with little amounts of solvent).

The pressure proof sample container preferably sustains a pressure of about 1 to about 10 bar and preferably about 2 to about 5 bar.

The kit of the present invention is in particular suitable for performing extraction of natural starting materials as defined above for an odor qualitative determination of an extract, especially as a small scale, micro-extraction, process, and thus could be procedural performed anywhere while the extracts obtaining through the method of the present invention show a high quality sensory profile and odor. In particular is has been observed that the extracts obtained capture the scent of the plant or the fruit which has been extracted in such a way that is a true rendition of the original product's scent or flavor. This gives a possibility of reproduction of the native smell in high quality to perfumers.

The kit is typically offered as a small suitcase having a dimension of about 50*60*15 cm.

EXAMPLES

Example 1

General Procedure for Extraction of a Plant

Various extraction materials were placed first into a sachet and the sachet then placed into a pressure proof sample container (extraction container) which possesses a gas-tight seal (septum). The extraction was performed in that compacted n-butane from a pressure vessel was transferred through the valve of the septum into the extraction container, thus the liquid n-butane gas could wet the plant material. The extraction container was set into rotation in order to let liquid butane wet all parts of the plant material for about 5 to 10 minutes. Subsequently, n-butane gas was leaked from the extraction container by opening the valve slowly. Subsequently ethanol was sprayed into the extraction container and the alcoholic extract was transferred into a storage container Example 2

Figure 2:
Figure 3:
Figure 4:
Figure 5:
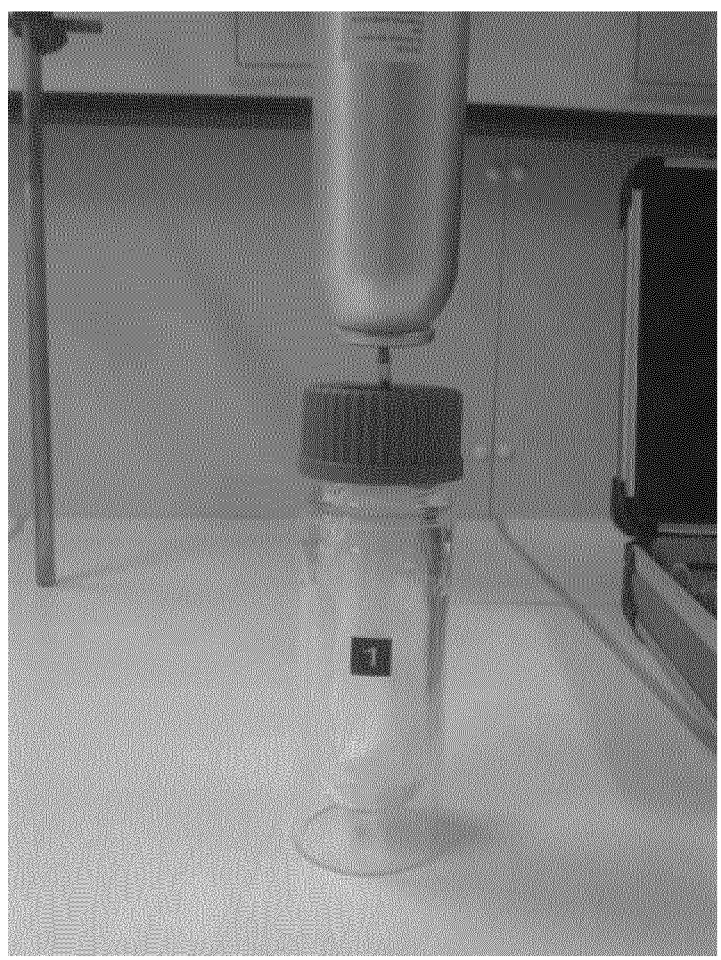
Figure 6:
Figure 7:
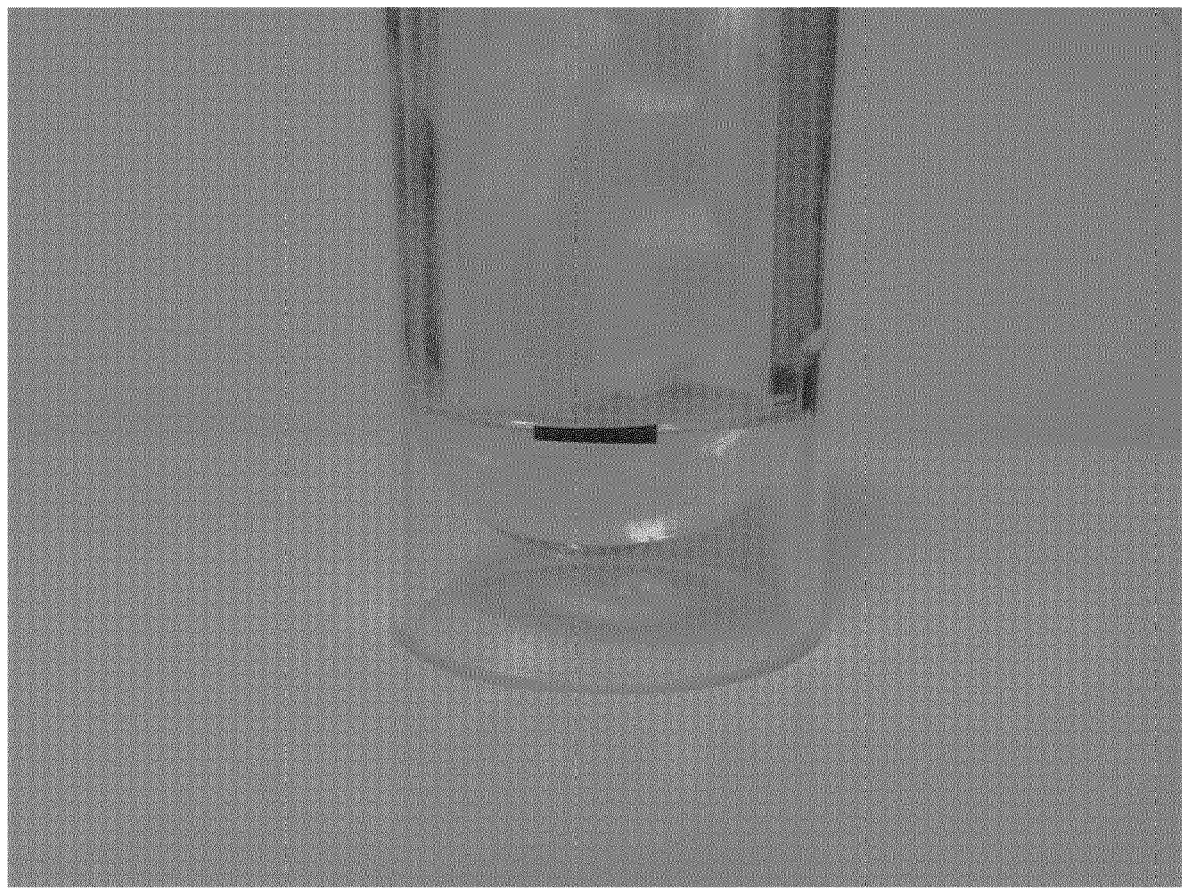
Figure 8:
Figure 9:
Figure 10:

Sampling Procedure
1. Using gloves take the object you would like to sample, pick it to pieces and fill it into a filter-bag (for better handling use the attached tweezer). The amount depends on the intensity of the smell of the object. If the smell is quite low you can fill the bag completely. If the smell is more intensive you need lower amounts.
2. Open the extraction-tube by screwing the screw cap and enter the bag into the tube (FIG. 1). Take care that the end of the bag containing the object is close to the bottom of the tube. The other end has to be near the screw cap (FIG. 2). Close the tube using the screw cap again.
3. Take one of the gas-adapters and connect it to one of the bottles of butane-gas (FIG. 3).
4. Connect the gas-bottle to the extraction-tube (FIGS. 4 and 5).
5. Press the gas-bottle toward the extraction-tube and fill up the tube to the black mark (FIGS. 6 and 7)
6. Extract the object by holding the tube at the end with the screw cap and swinging round the other end of the tube for 10 minutes.
7. Open the tube carefully. Remove the bag and squeeze out the butane from the bag to the tube by pushing the bag against the inner wall of the tube.
8. Add approximately 2 ml of ethanol (10 times pushing the pump valve of the ethanol-bottle) to the inner wall of the tube before the gas is completely evaporated (FIG. 8).
9. Wait until the butane in the solvent mixture is evaporated.
10. Solve the extract by slewing the tube and transfer the extract-solution using a pipette to one of the brown glass-bottles (FIGS. 9 and 10). Repeat this solving a second time to the same brown glass-bottle using 2 ml ethanol.
11. Close the brown glass-bottle and fill in the corresponding information sheet. Please note all possible information!
12. To use the extraction-tube again clean the tube and the seal well and replace the gas-valve in the screw cap. For cleaning use hot water and any solvent available (e.g. acetone).
13. Use the attached smelling strips to check the smell of the extract.

Example 3

Sensory Test

The sensorial profiles of the extracts obtaining according to the general extraction procedure described in Example 1 were compared with the respective sensorial profiles of extraction samples of the same plant starting material which has been extracted by a two-step process using first n-butane and then supercritical carbon dioxide as disclosed in EP 0711508 B1. The odors were evaluated by a panel consisting of 20 experienced perfumers and rated on the following scale (10)=both odors are identical to (1)=both odors are completely different. The results represent the average over all panelists and are compiled in the following Table 1:

TABLE 1

| Comparison of odors | | | |
| --- | --- | --- | --- |
| Example | Plant | Part | Accordance |
| 1 | Rose | blossom | 8.9 |
| 2 | Fig | leaves | 8.5 |
| 3 | Clove | fruits | 9.1 |
| 4 | Pepper | seeds | 9.5 |
| 5 | Lavender | blossom | 9.5 |
| 6 | Seringat | blossom | 9.1 |
| 7 | Vetiver | roots | 9.2 |

The results clearly demonstrate that the extracts obtained from the micro-process according to the present invention provide a rather similar to identical odour compared to the extracts that are obtained under industrial conditions Example 4

Comparison of Butane Extraction, Soxhlet Extraction and SDE 20 g peels taken from 4 oranges were subjected to a butane extraction according to the present invention, a standard Soxhlet extraction and SDE (pH=7, 4 h, 2 g defoamer). The extracts were evaluated both in terms of sensory profile and analytical composition. The results are compiled in Table 2.

TABLE 2

| | Analytical compositions (components above 0.05%) | | | |
|---|---|---|---|---|
| Component | Example 3 (Run A) | Example 3 (Run B) | SDE | Orange oil (BR) |
| Limonen | 89.116 | 91.483 | 95.095 | 95.317 |
| Myrcen, beta | 1.766 | 1.503 | 1.727 | 1.972 |
| Linalool | 0.331 | 0.727 | 0.334 | 0.484 |
| Sabinen | 1.067 | 0.548 | 0.727 | 0.273 |
| Valencen | 0.544 | 0.419 | 0.204 | 0.038 |
| Pinen, alpha | 0.405 | 0.093 | 0.422 | 0.515 |
| Pinen, beta | 0.055 | 0.023 | 0.040 | 0.021 |

Although all processes showed an acceptable accordance with regard to a standard orange oil from Brazil only the products obtained from the process according to the present invention provided a sensory profile similar to orange oil.

The invention claimed is:

1. A kit having a dimension of about 50 cm*60*cm*15 cm and suitable for a micro-extraction of samples of fragrances from natural starting materials, comprising:
   (i) a pressure proof double-walled sample container consisting of an inner wall and an outer wall, said container equipped with an exchangeable valve and forming a gas-tight seal;
   (ii) a pressure container, containing liquefied propane and/or butane gas, equipped with an outlet device;
   (iii) a coupler for the connection of (i) and (ii);
   (iv) a sachet, suitable for the intake of said sample materials; and
   (v) a storage container suitable for storing the extracted compounds.

2. The kit of claim 1, wherein the inner wall is made of glass and the outer wall is made of synthetic thermoplastic materials.

3. The kit of claim 1, wherein the inner wall is made of borosilicate glass.

4. The kit of claim 1, wherein the ground of the inner wall is rounded for easy removal of the fragrance extract.

5. The kit of claim 1, wherein the outer wall is made from polypropylene.

6. The kit of claim 1, wherein the outer wall is made of plastic and the inner wall is made of glass.

7. The kit of claim 6, wherein the glass is tinted.

8. The kit of claim 1, configured to sustain a pressure of about 1 to about 10 bar.

9. The kit of claim 1, additionally comprising a screw cap for said pressure proof sample container and comprising said exchangeable valve configured to be coupled to a gas-adapter in turn configured to be coupled to said pressure container as said coupler.

10. The kit of claim 1, wherein an end of said pressure proof sample container opposite said exchangeable valve is closed.

11. A method for the extraction of fragrances from natural starting materials with the kit of claim 1, and comprising the following steps:
   (a) placing a sample of the natural starting materials in the sachet and providing the sample in the pressure proof double-walled sample container;
   (b) bringing the sample in contact with liquefied propane and/or butane gas;
   (c) extracting the fragrances from the sample provided in step (b);
   (d) venting of the pressure proof double-walled sample container, while the liquefied propane and/or butane gas is evaporated and the fragrances are maintained as residue in the pressure proof double-walled sample container; and
   (e) dissolving the fragrances in a solvent selected from the group consisting of an alcohol having 1 to 5 carbon atoms, an ester having 1 to 5 carbon atoms, a ketone having 1 to 5 carbon atoms, an alkane having 5 to 8 carbon atoms, and mixtures thereof.

12. The method of claim 11, wherein step (b) is conducted at a temperature of from 5° C. to 70° C. and/or a pressure of from 0.5 bar to 10 bar.

13. The method of claim 11, wherein the natural starting materials are selected from the group consisting of a whole plant, leaves, blossoms, stems, seeds, bark, wood, resins, petals, stamen, pollen, fruits, root or a shoot of the plant, parts of fruits or blossoms, and mixtures thereof.

14. The method of claim 11, wherein said solvent is methanol and/or ethanol.

15. The method of claim 11, wherein the extract obtained from step (c) comprises a mixture of fragrances.

16. The method of claim 11 which is a micro-extraction method for odor test.

17. The method of claim 11, wherein said sample of said natural starting material has a maximum weight of 50 g.

* * * * *